(12) United States Patent
Shimizu et al.

(10) Patent No.: US 7,147,376 B2
(45) Date of Patent: Dec. 12, 2006

(54) DYNAMIC BEARING DEVICE

(75) Inventors: Seiji Shimizu, Aichi-ken (JP); Isao Komori, Kuwana (JP)

(73) Assignee: NTN Corporation, Osaka (JP)

( * ) Notice: Subject to any disclaimer, the term of this patent is extended or adjusted under 35 U.S.C. 154(b) by 129 days.

(21) Appl. No.: 10/865,035

(22) Filed: Jun. 9, 2004

(65) Prior Publication Data
US 2004/0258335 A1 Dec. 23, 2004

(30) Foreign Application Priority Data
Jun. 10, 2003 (JP) ............................. 2003-165383

(51) Int. Cl.
F16C 32/06 (2006.01)
(52) U.S. Cl. ...................................... 384/107; 384/100
(58) Field of Classification Search ................ 384/100, 384/107, 114, 279, 902
See application file for complete search history.

(56) References Cited
U.S. PATENT DOCUMENTS

| 4,774,749 A | * | 10/1988 | Furumura | 29/898.055 |
|---|---|---|---|---|
| 4,875,263 A | | 10/1989 | Furumura | 29/898.02 |
| 4,934,836 A | * | 6/1990 | Tanaka et al. | 384/100 |
| 5,009,520 A | * | 4/1991 | Takajo et al. | 384/100 |
| 5,129,739 A | * | 7/1992 | Asai et al. | 384/292 |
| 6,390,681 B1 | | 5/2002 | Nakazeki et al. | 384/107 |
| 6,439,774 B1 | * | 8/2002 | Knepper et al. | 384/110 |
| 6,846,109 B1 | * | 1/2005 | Yoshimura et al. | 384/279 |

FOREIGN PATENT DOCUMENTS

| JP | 2541208 | 7/1996 |
|---|---|---|
| JP | 10-306827 | 11/1998 |
| JP | 2002-364647 | 12/2002 |

* cited by examiner

*Primary Examiner*—Thomas R. Hannon
(74) *Attorney, Agent, or Firm*—J.C. Patents

(57) ABSTRACT

The dynamic bearing device of the invention comprises a housing, a bearing sleeve provided inside the housing, a rotating member rotating relative to the bearing sleeve, and a dynamic bearing portion supporting the rotating member in a non-contact manner by dynamic pressure action of a lubricating fluid generated in a bearing gap between the bearing sleeve and the rotating member. The bearing sleeve has a parent body formed of a sintered metal and a bearing surface facing the bearing gap and formed by a resin layer. The dynamic pressure generating grooves are formed in the resin layer.

8 Claims, 4 Drawing Sheets

DYNAMIC BEARING DEVICE

BACKGROUND OF THE INVENTION

The present invention relates to a dynamic bearing device (fluid dynamic bearing device) for supporting a rotating member in a non-contact manner by dynamic pressure action of lubricating oil generated in a bearing gap. The bearing device is suitable for spindle motors of information equipment, for example, magnetic disk devices such as HDD and FDD, optical disk devices such as CD-ROM, CD-R/RW, and DVD-ROM/RAM, magneto-optical disk devices such as MD and MO, polygon scanner motors of laser beam printers (LBP), DLP (Digital Light Processing) projector and electrical apparatuses such as axial flow fans for small motors.

DESCRIPTION OF THE RELATED ART

Requirements for the various types of motors mentioned above include highly accurate revolution as well as high speed, low cost, and low noise. One of the components responsible for the performance required is the bearing for supporting the spindle of the motor. These days, as a bearing of this type, dynamic pressure bearings with outstanding properties to meet the aforementioned requirements for performance have been studied or are in practical use.

For example, in a dynamic bearing device incorporated into the spindle motor of a disk drive device, such as HDD, there are provided a radial bearing portion radially supporting a shaft member in a non-contact fashion and a thrust bearing portion for supporting the shaft member in the thrust directions in a non-contact manner; as the radial bearing portion, there is used a dynamic bearing having dynamic pressure generating grooves in the inner peripheral surface of a bearing sleeve or in the outer peripheral surface of the shaft member. As the thrust bearing portion, there is used, for example, a dynamic bearing having dynamic pressure generating grooves in both end surfaces of the flange portion of the shaft member or in surfaces opposed thereto (the end surfaces of the bearing sleeve, the end surfaces of the thrust member fixed to the housing, etc.) (see, JP 2000-291648 A).

Usually, the bearing sleeve is formed of a metal material, such as sintered metal or soft metal; when providing dynamic pressure generating grooves in the bearing sleeve, form rolling, etching, press working, or the like is adopted as the method of forming the dynamic pressure generating grooves (see, JP 2541208 B and JP 10-306827 A).

The method of forming dynamic pressure generating grooves in the inner peripheral surface of a metal bearing sleeve by form rolling (JP 2541208 B) not only requires complicated equipment, but also involves a post-processing after the formation of the dynamic pressure generating grooves, which is disadvantageous in terms of production cost. The method of forming dynamic pressure generating grooves by etching involves a lot of processing man-hours, which is disadvantageous in terms of production cost; further, it is rather difficult to form the dynamic pressure generating grooves with high precision in terms of configuration and dimension.

In contrast, the method of forming dynamic pressure generating grooves by press working (JP 10-306827 A) does not involve the problems as mentioned above, making it possible to form dynamic pressure generating grooves with simple equipment, in few man-hours, and with high precision. In this forming method, however, after the formation of the dynamic pressure generating grooves, the die for forming the dynamic pressure generating grooves is released from the inner peripheral surface of the bearing sleeve by utilizing the spring-back of the bearing sleeve formed of sintered metal, so that, when applying this forming method, there may be limitations regarding the inner diameter, wall thickness, and axial length of the bearing sleeve.

SUMMARY OF THE INVENTION

It is an object of the present invention to provide a less expensive dynamic bearing device by reducing the production cost of a bearing sleeve having dynamic pressure generating grooves.

It is another object of the present invention to provide a dynamic bearing device in which dynamic pressure generating grooves of a bearing sleeve can be formed with relatively high precision in few man-hours and there is little limitation in terms of the inner diameter, wall thickness, and axial length of the bearing sleeve.

To attain the above objects, according to the present invention, there is provided a dynamic bearing device including: a housing; a bearing sleeve provided inside the housing; a rotating member rotating relative to the bearing sleeve; and a dynamic bearing portion supporting the rotating member in a non-contact manner by dynamic pressure action of a lubricating fluid generated in a bearing gap between the bearing sleeve and the rotating member, wherein the bearing sleeve has a parent body formed of a sintered metal and a bearing surface facing the bearing gap and formed by a resin layer, and wherein dynamic pressure generating grooves are formed in the resin layer.

Here, the above-mentioned lubricating fluid may be, lubricating oil, lubricating grease, or a gas, such as air. That is, examples of the dynamic bearing of the present invention include a so-called gas bearing.

The parent body of the bearing sleeve is formed of sintered metal, so that, as compared with a so-called resin bearing that is entirely formed of resin material, this type of bearing involves little dimensional variation due to water absorption and temperature change, and is superior in dimensional stability. Thus, the bearing gap between the bearing sleeve and the rotating member undergoes little fluctuation, thus making it possible to obtain stable dynamic pressure action. Further, the bearing surface of the bearing sleeve facing the bearing gap is formed by a resin layer, so that if the bearing surface and the rotating member come into direct contact with each other in a state in which the dynamic pressure action of the lubricating fluid in the bearing gap is not exerted to a sufficient degree as in the case of starting or stopping the dynamic bearing device, the bearing surface and the surface of the rotating member opposed thereto are not easily flawed, thus making it possible to obtain a stable bearing function over a long period of time. It is to be noted that the bearing sleeve has at least a radial bearing surface radially supporting the rotating member in a non-contact fashion; in addition, it may also have a thrust bearing surface supporting the rotating member in the thrust direction in a non-contact manner.

Further, in the construction in which the bearing surface (resin layer) is provided on the inner peripheral surface of the bearing sleeve, it is possible, after the formation of the dynamic pressure generating grooves, to release the die for forming the dynamic pressure generating grooves from the inner peripheral surface of the bearing sleeve by utilizing the elasticity of the resin layer itself. Thus, the limitations regarding the inner diameter, wall thickness, and axial length of the bearing sleeve are mitigated, thereby achieving an improvement in terms of degree of freedom in design and production.

The parent body of the bearing sleeve can be formed by using, as the main material, one or more kinds of metal powder selected, for example, from copper, iron, and aluminum, mixing this powder with powder of tin, zinc, lead, graphite, molybdenum disulfide, or the like or alloy powder thereof as needed (For enhancement of moldability and releasing property, it is possible to add a small amount of binder or the like as needed), forming the parent body in a predetermined configuration, and performing, as needed, a post-processing, such as sizing, on the sintered body (sintered metal) obtained by sintering. Inside this parent body, there are a large number of internal pores due to the porous texture of the sintered metal, and in the surface of the parent body, there are a large number of surface holes consisting of internal pores opening to the exterior. The internal pores of the parent body may be impregnated with lubricating oil, lubricating grease or the like as needed through vacuum impregnation or the like.

The texture of the resin layer forming the bearing surface may be one allowing passage of lubricating fluid or one not allowing passage of lubricating fluid. In the former case, it is possible to realize a construction in which the lubricating fluid circulates between the interior of the parent body and the bearing gap through the resin layer. In the latter case, the lubricating fluid in the bearing gap does not escape into the interior of the parent body through the resin layer, so that there is no pressure loss of the lubricating fluid in the bearing gap, making it possible to achieve high bearing rigidity. Usually, when a bearing sleeve formed of sintered metal is used, sealing processing is conducted in many cases on the bearing surface prior to the formation of the dynamic pressure generating grooves; however, complete sealing is not effected on the bearing surface, and a predetermined proportion (several percent to ten and several percent) of surface holes are allowed to remain. Thus, some pressure loss tends to be generated in the bearing gap. In the latter case, complete sealing of the bearing surface is effected by the formation of the resin layer, so that the above-mentioned problem of pressure loss is eliminated. At the same time, the conventionally conducted sealing process is eliminated, thereby simplifying the production process (The cleaning process after the sealing processing can also be eliminated). The construction in which the bearing surface is completely sealed is particularly advantageous in a gas bearing.

The resin layer of the bearing sleeve is formed on a predetermined surface of the parent body by, for example, insert molding, and has a bearing surface facing the bearing gap between the resin layer and the rotating member. At the time of the formation of the resin layer, the molten resin forming the resin layer enters the internal pores in the surface portion of the parent body through the surface holes formed in the predetermined surface of the parent body and solidifies therein, so that the resin layer is firmly attached to the surface of the parent body through a kind of anchor solidification. Thus, the resin layer is not easily separated or detached from the parent body surface, thus providing high durability.

The dynamic pressure generating grooves of the resin layer can be formed by, for example, previously forming at a predetermined position (the position where the bearing surface is formed) of the die for forming the resin layer a groove pattern for forming the dynamic pressure generating grooves, and transferring the configuration of the groove pattern to the bearing surface of the resin layer at the time of the formation of the resin layer. In this way, by forming the dynamic pressure generating grooves of the resin layer simultaneously with the formation of the resin layer, it is possible to form the dynamic pressure generating grooves of the bearing sleeve with relatively high precision in few man-hours.

The resin layer is formed preferably of a resin material superior in sliding property, and the resin material may be combined with oil or solid lubricant as required. Examples of the resin material forming the resin layer include polyethylene, polyamide, polyacetal, polyethylene terephthalate, polybutylene terephthalate, polycarbonate, polyphenylene sulfide, polyethersulfone, polyetherimide, polyamidimide, polyetheretherketone, thermoplastic polyimide, thermosetting polyimide, an epoxy resin, and a phenol resin.

Examples of the solid lubricant include polytetrafluoroethylene, graphite, molybdenum disulfide, boron nitride, and tungsten disulfide. Lubricating oil used typically can be used as the oil, and examples of the lubricating oil include: mineral oil such as spindle oil, refrigerating machine oil, turbine oil, machine oil, and dynamo oil; and synthetic oil such as hydrocarbon, ester, polyglycol, silicone oil, and fluorine oil.

An appropriate filler can be added to the resin material forming the resin layer for improving friction and abrasion properties or for reducing the coefficient of linear expansion. Examples of the filler include: fibers such as a glass fiber, a carbon fiber, a pitch-based carbon fiber, a PAN-based carbon fiber, an aramid fiber, an alumina fiber, a polyester fiber, a boron fiber, a silicon carbide fiber, a boron nitride fiber, a silicon nitride fiber, a metal fiber, asbestos, and coal wool and woven fabric thereof; minerals such as calcium carbonate or talc, silica, clay, and mica; inorganic whiskers such as an aluminum borate whisker and a potassium titanate whisker; carbon black; graphite; and various heat-resistant resins such as a polyimide resin and polybenzimidazole. Further, a carbon fiber, a metal fiber, graphite powder, zinc oxide, or the like may be added for improving thermal conductivity of the resin layer. Further, carbonates such as lithium carbonate and calcium carbonate and phosphates such as lithium phosphate and calcium phosphate may be combined.

It is also possible to use an additive applicable widely to synthetic resins in general within a range that does not impair the effect of the present invention. For example, it is also possible to add industrial additives, such as releasing agent, flame retardant, antistatic agent, weatherability improving agent, antioxidant, and coloring agent as appropriate. Further, within a range that does not impair the lubrication property of the resin layer, it is possible to effect, when it is in the form of an intermediate product or final product, modification for property improvement through chemical or physical treatment, such as annealing.

In the resin layer, it is desirable for {the coefficient of linear expansion of the resin material ($°C.^{-1}$)}×{the thickness of the resin layer (μm)} to be 0.15 or less, more preferably, 0.13 or less, and most preferably, 0.10 or less. If the above value is larger than 0.15, the bearing gap undergoes fluctuation to a relatively large degree due to variation in the dimension of the resin layer as a result of water absorption, temperature change, etc., which is likely to lead to fluctuation in torque and a deterioration in rotational accuracy. The thickness of the resin layer that allows molding is approximately 50 μm. A thickness smaller than this makes the molding difficult. Thus, it is desirable for the above value to be 0.003 or more, more preferably, 0.01 or more, and most preferably, 0.015 or more.

DESCRIPTION OF THE PREFERRED EMBODIMENTS

An embodiment of the present invention will now be described.

Figure 1:
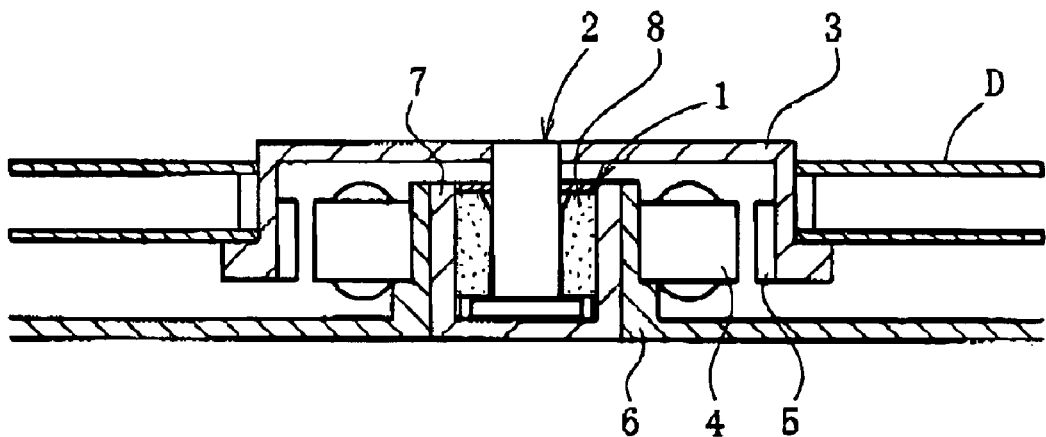
FIG. 1 is a sectional view of a spindle motor for an information apparatus into which a dynamic bearing device according to an embodiment of the present invention is incorporated.

FIG. 1 is a conceptual drawing showing an example of the construction of a spindle motor for an information apparatus into which a dynamic bearing device (fluid dynamic bearing device) 1 according to this embodiment is incorporated. This spindle motor is used in a disk drive device, such as HDD, and has a dynamic bearing device 1 rotatably supporting a shaft member 2 as a rotating member in a non-contact manner, a rotor (disc hub) 3 attached to the shaft member 2, and a stator 4 and a rotor magnet 5 that are opposed to each other through the intermediation, for example, of a radial gap. The stator 4 is mounted to the outer periphery of a bracket 6, and the rotor magnet 5 is mounted to the inner periphery of the disc hub 3. A housing 7 of the dynamic bearing device 1 is attached to the inner periphery of the bracket 6. One or a plurality of disks D, such as magnetic disks, are retained by the disk hub 3. When the stator 4 is energized, the rotor magnet 5 is rotated by electromagnetic force between the stator 4 and the rotor magnet 5, whereby the disk hub 3 and the shaft member 2 rotate integrally.

Figure 2:
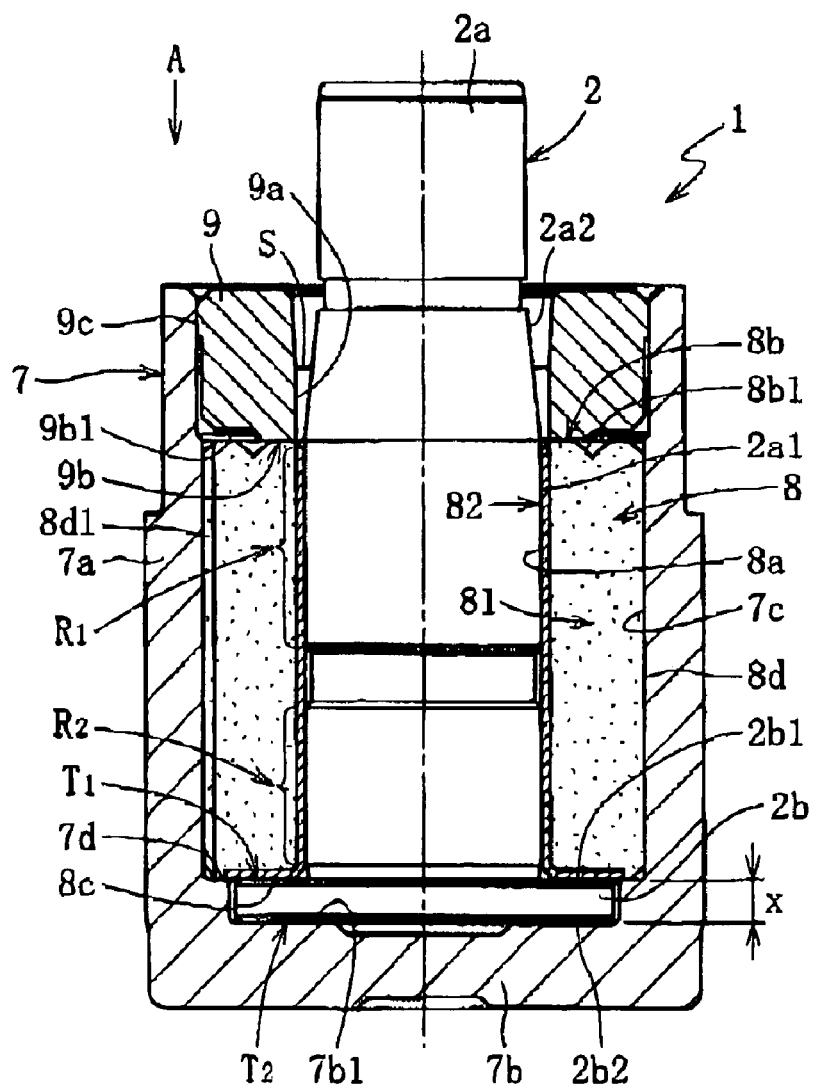
FIG. 2 is a sectional view of a dynamic bearing device according to an embodiment of the present invention.

FIG. 2 shows the dynamic bearing device 1. The dynamic bearing device 1 is composed of the housing 7, a bearing sleeve 8 and a seal member 9 that are fixed to the housing 7, and the shaft member 2.

Between an inner peripheral surface 8a of the bearing sleeve 8 and an outer peripheral surface 2a1 of a shaft portion 2a of the shaft member 2, there are provided a first radial bearing portion R1 and a second radial bearing portion R2 that are spaced apart from each other in the axial direction. Further, between a lower end surface 8c of the bearing sleeve 8 and an upper end surface 2b1 of a flange portion 2b of the shaft member 2, there is provided a first thrust bearing portion T1, and between an inner bottom surface 7b1 of a bottom portion 7b of the housing 7 and a lower end surface 2b2 of the flange portion 2b, there is provided a second thrust bearing portion T2. In the following, for the sake of convenience in illustration, the bottom portion 7b side of the housing 7 will be referred to as the lower side, and the side opposite to the bottom portion 7b will be referred to as the upper side.

Figure 3:
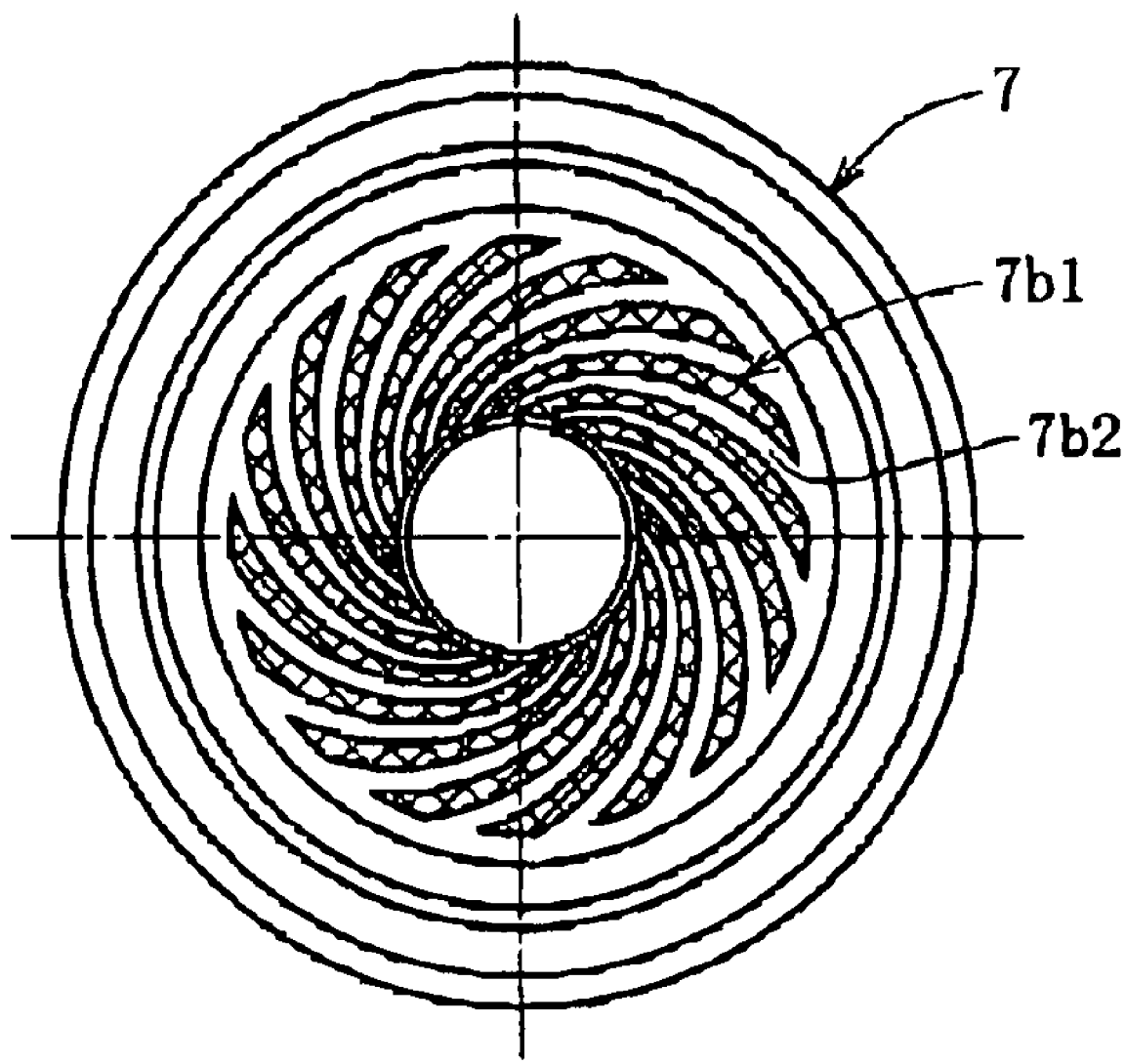
FIG. 3 is a view of a housing as seen from the direction of the arrow A of FIG. 2.

The housing 7 is formed, for example, as a bottomed cylinder by injection molding of a resin material obtained by combining liquid crystal polymer (LCP) as a crystalline resin with 3 to 8 wt % of carbon nanotube as conductive filler, and is equipped with a cylindrical side portion 7a and the bottom portion 7b integrally provided at the lower end of the side portion 7a. As shown in FIG. 3, in the inner bottom surface 7b1 of the bottom portion 7b constituting the thrust bearing surface of the second thrust bearing portion T2, there are formed dynamic pressure generating grooves 7b2 in, for example, a spiral configuration. The dynamic pressure generating grooves 7b2 are formed at the time of injection molding of the housing 7. That is, at a predetermined position of a die for forming the housing 7 (the position where the inner bottom surface 7b1 is formed), a groove pattern for forming the dynamic pressure generating grooves 7b2 is previously machined, and at the time of injection molding of the housing 7, the configuration of the groove pattern is transferred to the inner bottom surface 7b1 of the housing 7, whereby it is possible to form the dynamic pressure generating grooves 7b2 simultaneously with the formation of the housing 7. Further, at a position spaced apart from the inner bottom surface 7b1 axially upwards by a predetermined dimension x, there is formed a step portion 7d.

The shaft member 2 is formed of a metal material, such as stainless steel, and is equipped with the shaft portion 2a and the flange portion 2b provided integrally or separately at the lower end of the shaft portion 2a.

The bearing sleeve 8 is composed of a cylindrical parent body 81 formed of a porous material, in particular, a porous material consisting of a sintered metal whose main component is copper, and a resin layer 82 formed on a predetermined surface of the parent body 81. In this embodiment, the resin layer 82 is formed so as to extend from the inner peripheral surface to the lower end surface of the parent body 81, and the inner peripheral surface 8a and the lower end surface 8c of the bearing sleeve 8 are formed by the resin layer 82.

The resin layer 82 of the bearing sleeve 8 is formed, for example, by insert molding (injection molding) so as to extend from the inner peripheral surface to the lower end surface of the parent body 81. When forming the resin layer 82, the molten resin forming the resin layer 82 enters the internal pores of the surface portion of the parent body 81 through the surface holes in the surface of the parent body 81 and is solidified therein, so that the resin layer 82 is firmly attached to the surface of the parent body 81 by a kind of anchor solidification. In the resin layer 82, the value of {the coefficient of linear expansion of the resin material (° $C.^{-1}$)}×{the thickness of the resin layer (μm)} is 0.15 or less.

In the inner peripheral surface 8a of the bearing sleeve 8 formed by the resin layer 82, there are formed upper and lower regions axially spaced apart from each other and respectively constituting the radial bearing surfaces of a first radial bearing portion R1 and a second radial bearing portion R2. In these two regions, there are respectively formed herringbone-shaped dynamic pressure generating grooves 8a1 and 8a2 as shown, for example, in FIG. 4A. The upper dynamic pressure generating grooves 8a1 are formed asymmetrically with respect to the axial center m (the axial center of the region between the upper and lower inclined grooves), with the axial dimension X1 of the region above the axial center m being larger than the axial dimension X2 of the region below the same. Further, in the lower end surface 8c of the bearing sleeve 8 formed by the resin layer 82, there is formed a region constituting the thrust bearing surface of the first thrust bearing portion T1, and in this region, there are formed dynamic pressure generating grooves 8c1 in a spiral configuration as shown, for example, in FIG. 4B. The dynamic pressure generating grooves 8a1, 8a2, and 8c1 of the bearing surfaces formed in the resin layer 82 can be formed by previously machining groove patterns for forming the dynamic pressure generating grooves 8a1, 8a2, and 8c1 at predetermined positions (the positions where the bearing surfaces are formed) of the die for forming the resin layer 82, and transferring the configurations of the groove patterns to the bearing surfaces of the resin layer 82 at the time of formation of the resin layer 82. In this way, the dynamic pressure generating grooves 8a 1, 8a2, and 8c1 of the bearing surfaces of the resin layer 82 and the resin layer 82 are formed simultaneously with the formation of the resin layer 82, whereby it is possible to form the bearing sleeve 8 with relatively high precision in few man-hours. Further, after the formation of the resin layer 82, the die can be released from the inner peripheral surface 8a of the bearing sleeve 8 without destroying the dynamic pressure generating grooves 8a1 and 8a2 by utilizing the elastic deformation of the resin layer 82 itself.

Further, in the outer peripheral surface 8d of the bearing sleeve 8 formed by the parent body 81, one or a plurality of axial grooves 8d1 are formed so as to extend over the entire axial length thereof. In this example, three axial grooves 8d1 are formed at equal circumferential intervals.

Figure 4A:
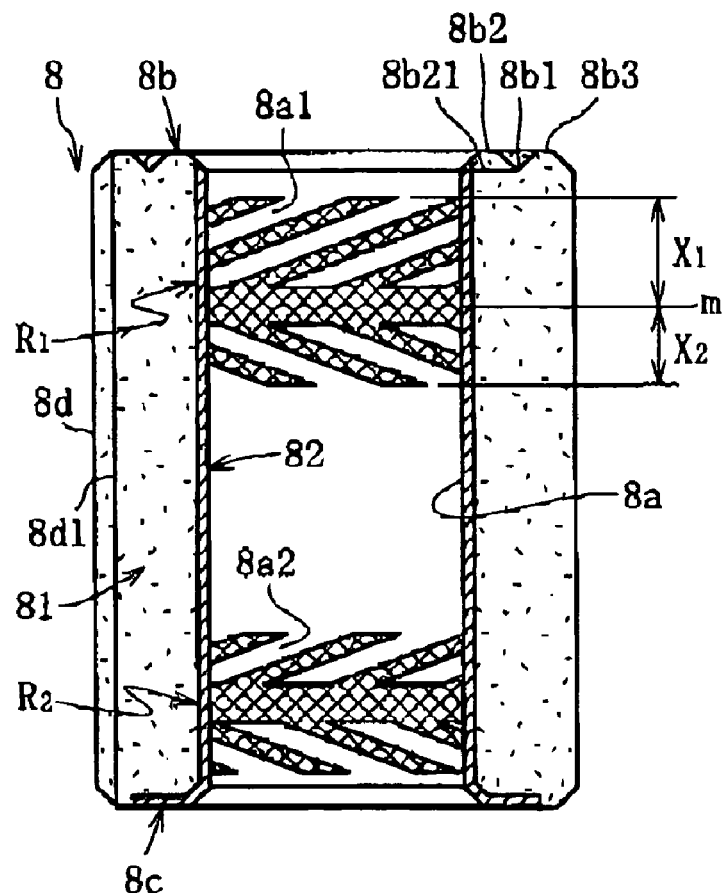
FIGS. 4A, 4B, and 4C are a sectional view, a lower end view, and an upper end view, respectively, of a bearing sleeve.
Figure 4B:
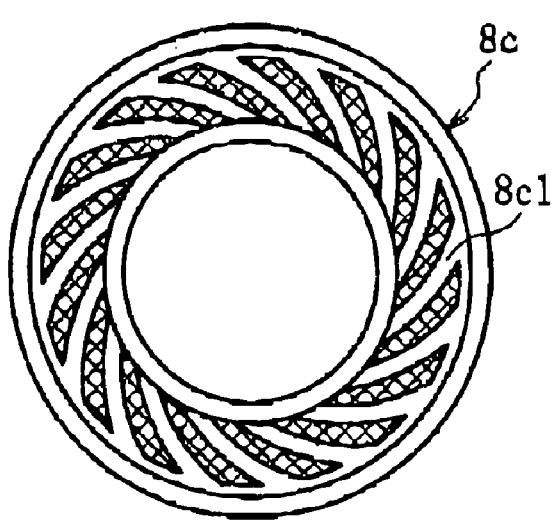
Figure 4C:
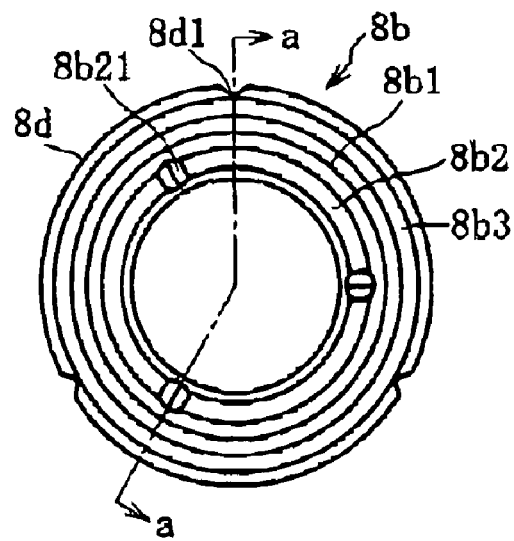

As shown in FIG. 4C, the upper end surface 8b of the bearing sleeve 8 formed by the parent body 81 is divided into an inner area 8b2 and an outer area 8b3 by a circumferential groove 8b1 provided in a substantially central portion with respect to the radial direction, and one or a plurality of radial grooves 8b21 are formed in the inner area 8b2. In this example, there are formed three radial grooves 8b21 at equal circumferential intervals.

The bearing sleeve 8 as described above is fixed at a predetermined position of the inner peripheral surface 7c of the housing 7.

The seal member 9 is fixed, for example, to the inner periphery of the upper end portion of the side portion 7a of the housing 7, and an inner peripheral surface 9a thereof is opposed to a tapered surface 2a2 of the shaft portion 2a provided in the outer periphery of the shaft portion 2a through the intermediation of a predetermined seal space S. The tapered surface 2a2 of the shaft portion 2a is gradually reduced in diameter toward the upper side (the external side with respect to the housing 7), and also functions as a centrifugal force seal through the rotation of the shaft member 2. Further, the diameter of an outer area 9b1 of a lower end surface 9b of the seal member 9 is slightly larger than that of the inner area.

The dynamic bearing device 1 of this embodiment is assembled, for example, by the following processes.

First, the shaft member 2 is attached to the bearing sleeve 8. Then, the bearing sleeve 8 is inserted into the inner peripheral surface 7c of the side portion 7a of the housing 7 together with the shaft member 2, and the lower end surface 8c thereof is brought into contact with the step portion 7d of the housing 7, whereby axial positioning is effected on the bearing sleeve 8 with respect to the housing 7. In this state, the bearing sleeve 8 is fixed to the housing 7 by an appropriate means, such as ultrasonic welding.

Next, the seal member 9 is inserted into the inner periphery of the upper end portion of the side portion 7a of the housing 7, and the inner area of the lower end surface 9b thereof is brought into contact with the inner area 8b2 of the upper end surface 8b of the bearing sleeve 8. Then, in this state, the seal member 9 is fixed to the housing 7 by an appropriate means, such as ultrasonic welding. Provision of a rib 9c in the form of a protrusion on the outer peripheral surface of the seal member 9 will prove effective in enhancing the fixing force to be obtained by welding.

When the assembly has been completed as described above, the shaft portion 2a of the shaft member 2 is inserted into the inner peripheral surface 8a of the bearing sleeve 8, and the flange portion 2b is accommodated in the space between the lower end surface 8c of the bearing sleeve 8 and the inner bottom surface 7b1 of the housing 7. Thereafter, the inner space of the housing 7 hermetically sealed by the seal member 9, including the internal pores of the bearing sleeve 8, is filled with lubricating fluid, e.g., lubricating oil. The oil level of the lubricating oil is maintained within the range of the seal space S.

During rotation of the shaft member 2, the regions (the upper and lower regions) of the inner peripheral surface 8a of the bearing sleeve 8 constituting the radial bearing surface is opposed to the outer peripheral surface 2a1 of the shaft portion 2a through the intermediation of the radial bearing gap. Further, the region of the lower end surface 8c of the bearing sleeve 8 constituting the thrust bearing surface is opposed to the upper end surface 2b1 of the flange portion 2b through the intermediation of the thrust bearing gap, and the region of the inner bottom surface 7b1 of the housing 7 constituting the thrust bearing surface is opposed to the lower end surface 2b2 of the flange portion 2b through the intermediation of the thrust bearing gap. As the shaft member 2 rotates, dynamic pressure of the lubricating oil is generated in the radial bearing gap, and the shaft portion 2a of the shaft member 2 is rotatably supported in the radial direction in a non-contact manner by the oil film of the lubricating oil formed in the radial bearing gap, whereby there are formed the first radial bearing portion R1 and the second radial bearing portion R2 rotatably supporting the shaft member 2 in the radial direction in a non-contact manner. At the same time, dynamic pressure of the lubricating oil is generated in the thrust bearing gap, and the flange portion 2b of the shaft member 2 is rotatably supported in both thrust directions in a non-contact manner by the oil film of the lubricating oil formed in the thrust bearing gap, whereby there are formed the first thrust bearing portion T1 and the second thrust bearing portion T2 rotatably supporting the shaft member 2 in the thrust directions in a non-contact manner. The thrust bearing gap of the first thrust bearing portion T1 (hereinafter referred to as δ1) and the thrust bearing gap of the second thrust bearing portion T2 (hereinafter referred to as δ2) can be controlled with high accuracy by establishing the relationship: $x-w=\delta1+\delta2$; where x is the axial dimension x from the inner bottom surface 7b1 to the step portion 7d of the housing 7, and w is the axial dimension of the flange portion 2b of the shaft member 2.

As stated above, the dynamic pressure generating grooves 8a1 of the first radial bearing portion R1 are formed asymmetrically with respect to the axial center m, with the axial dimension X1 of the region above the axial center m being larger than the axial dimension X2 of the region below the same (FIG. 4A). As a result, during rotation of the shaft member 2, the lubricating oil drawing force (pumping force) due to the dynamic pressure generating grooves 8a1 is larger in the upper region than in the lower region. Due to this difference in drawing force, the lubricating oil filling the gap between the inner peripheral surface 8a of the bearing sleeve 8 and the outer peripheral surface 2a1 of the shaft portion 2a flows downwards, and circulates by the following route: (the thrust bearing gap of the first thrust bearing portion T1)→(the axial groove 8d1)→(the annular gap between the outer area 9b1 of the lower end surface 9b of the seal member 9 and the outer area 8b3 of the upper end surface 8b of the bearing sleeve 8)→(the circumferential groove 8b1 in the upper end surface 8*b* of the bearing sleeve 8)→(the radial groove 8*b*21 in the upper end surface 8*b* of the bearing sleeve 8) before being drawn into the radial bearing gap of the first radial bearing portion R1 again. Due to this construction allowing circulation of the lubricating oil in the inner space of the housing 7, it is possible to prevent occurrence of a phenomenon in which the pressure of the lubricating oil in the inner space of the housing 7 becomes locally negative, thereby making it possible to prevent generation of bubbles due to the generation of negative pressure, leakage of lubricating oil due to the generation of bubbles, generation of vibration, etc. Further, if, for some reason, bubbles are allowed to get into the lubricating oil, the bubbles are discharged into the atmosphere from the oil surface (gas-liquid interface) of the lubricating oil in the seal space S when they circulate with the lubricating oil, so that the adverse effect of the bubbles is eliminated even more effectively.

Figure 5:
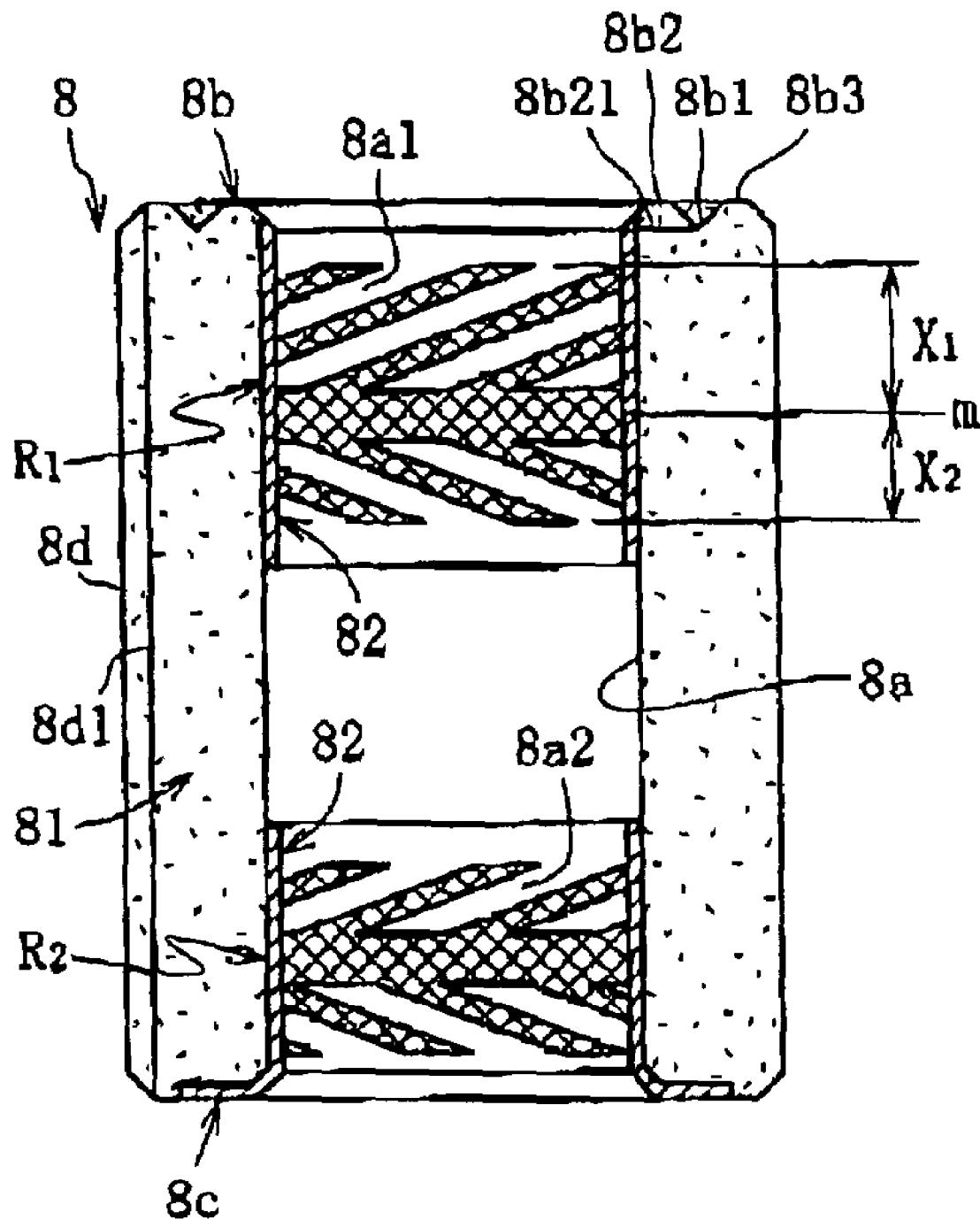
FIG. 5 is a sectional view of a bearing sleeve according to another embodiment of the present invention.

FIG. 5 shows a bearing sleeve 8 according to another embodiment of the present invention. In this embodiment, of the inner peripheral surface 8*a* of the bearing sleeve 8, only the upper and lower regions constituting the first radial bearing portion R1 and the second radial bearing portion R2 are formed by the resin layer 82, with the interval between the upper and lower resin layers 82 being formed by the parent body 81. During rotation of the bearing member 2, the lubricating oil filling (impregnated into) the internal pores of the parent body 81 exudes into the gap between the inner peripheral surface 8*a* of the bearing sleeve 8 and the outer peripheral surface 2*a*1 of the shaft portion 2*a* through the surface holes in the surface of the parent body 81 situated between the upper and lower resin layers 82, whereby it is possible to more effectively prevent the occurrence of the phenomenon in which the lubricating oil pressure in the inner space of the housing 7 becomes locally negative.

What is claimed is:

1. A dynamic bearing device comprising: a housing; a bearing sleeve provided inside the housing; a rotating member rotating relative to the bearing sleeve; and a dynamic bearing portion supporting the rotating member in a non-contact manner by dynamic pressure action of a lubricating fluid generated in a bearing gap between the bearing sleeve and the rotating member, wherein the bearing sleeve has a parent body formed of a sintered metal, and radial bearing surfaces formed on an inner peripheral surface of the bearing sleeve, the radial bearing surfaces being formed by a resin layer, the resin layer being formed with dynamic pressure generating grooves, and wherein the lubricating fluid is allowed to pass a region between the radial bearing surfaces to exude from internal pores of the parent body into a gap between the inner peripheral surface of the bearing sleeve and an outer peripheral surface of the rotating member.

2. The dynamic bearing device according to claim 1, wherein the region between the radial bearing surfaces is also formed by the resin layer, and the resin layer is to allow passage of the lubricating fluid.

3. A dynamic bearing device according to claim 1, wherein, in the resin layer, a value of {a coefficient of linear expansion of a resin material (° C.$^{-1}$)}×{a thickness of the resin layer (μm)} is 0.15 or less.

4. The dynamic bearing device according to claim 1, wherein the region between the radial bearing surfaces is formed by a surface of the parent body.

5. The dynamic bearing device according to claim 1, wherein the dynamic pressure generating grooves of the resin layer is formed simultaneously with the formation of the resin layer.

6. The dynamic bearing device according to claim 1, wherein the bearing sleeve has a thrust bearing surface on an end surface thereof, and the thrust bearing surface being formed by a resin layer.

7. The dynamic bearing device according to claim 6, wherein the resin layer of the thrust bearing surface is formed with dynamic pressure generating grooves.

8. The dynamic bearing device according to claim 7, wherein the resin layer of the radial bearing surface which is positioned at the side of the thrust bearing surface, and the resin layer of the thrust bearing surface are continuous to each other.

* * * * *